United States Patent [19]

Field

[11] 4,333,092
[45] Jun. 1, 1982

[54] COMMUNICATION AID MEANS AND METHOD

[76] Inventor: Max N. Field, 501 E. 56th St. South, Wichita, Kans. 67216

[21] Appl. No.: 168,601

[22] Filed: Jul. 14, 1980

[51] Int. Cl.³ .............................................. G08B 5/22
[52] U.S. Cl. ............................. 340/378.2; 340/286 R; 340/378.3; 340/711; 434/112
[58] Field of Search ............ 340/378.2, 286 R, 378.3, 340/332, 765, 711, 365 VL; 434/112, 113, 114, 115, 116, 117, 169

[56] References Cited

U.S. PATENT DOCUMENTS

| | | | |
|---|---|---|---|
| 1,984,599 | 12/1934 | Šafář | 340/332 X |
| 2,154,478 | 4/1939 | Smith | 340/332 |
| 2,376,278 | 5/1945 | Scheld et al. | 340/332 X |
| 2,500,507 | 3/1950 | Avery et al. | 340/332 UX |
| 2,536,290 | 1/1951 | Jones | 340/332 X |
| 3,751,825 | 8/1973 | Barrett | 340/711 |

OTHER PUBLICATIONS

Let's Talk; "Single Hand Alphabet of the Deaf;" 4/2/63.

Primary Examiner—John W. Caldwell, Sr.
Assistant Examiner—Daniel Myer
Attorney, Agent, or Firm—John H. Widdowson

[57] ABSTRACT

Apparatus and method for communicating comprises a control box having an alphanumeric keyboard with a plurality of switches. A control box electronic circuitry is disposed within the control box and has a power source and a plurality of conductors. The apparatus also includes a display box for displaying what's on the alphanumeric keyboard, and a display box electronic circuitry which is disposed within the display box. Communication with a mute is accomplished by working the keyboard and thereby lighting up in the display box a numeral and corresponding hand sign, or a letter and corresponding hand sign, and with the mute watching the display communication with him or her is accomplished.

2 Claims, 8 Drawing Figures

U.S. Patent    Jun. 1, 1982    Sheet 2 of 3    4,333,092
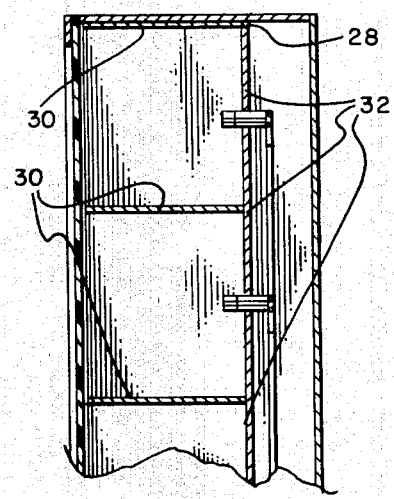
FIG. 4
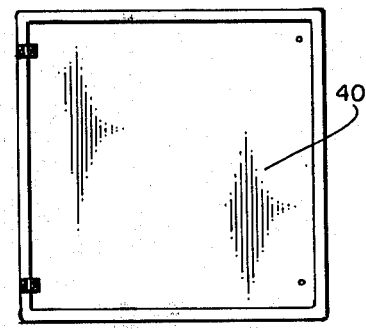
FIG. 5
FIG. 6
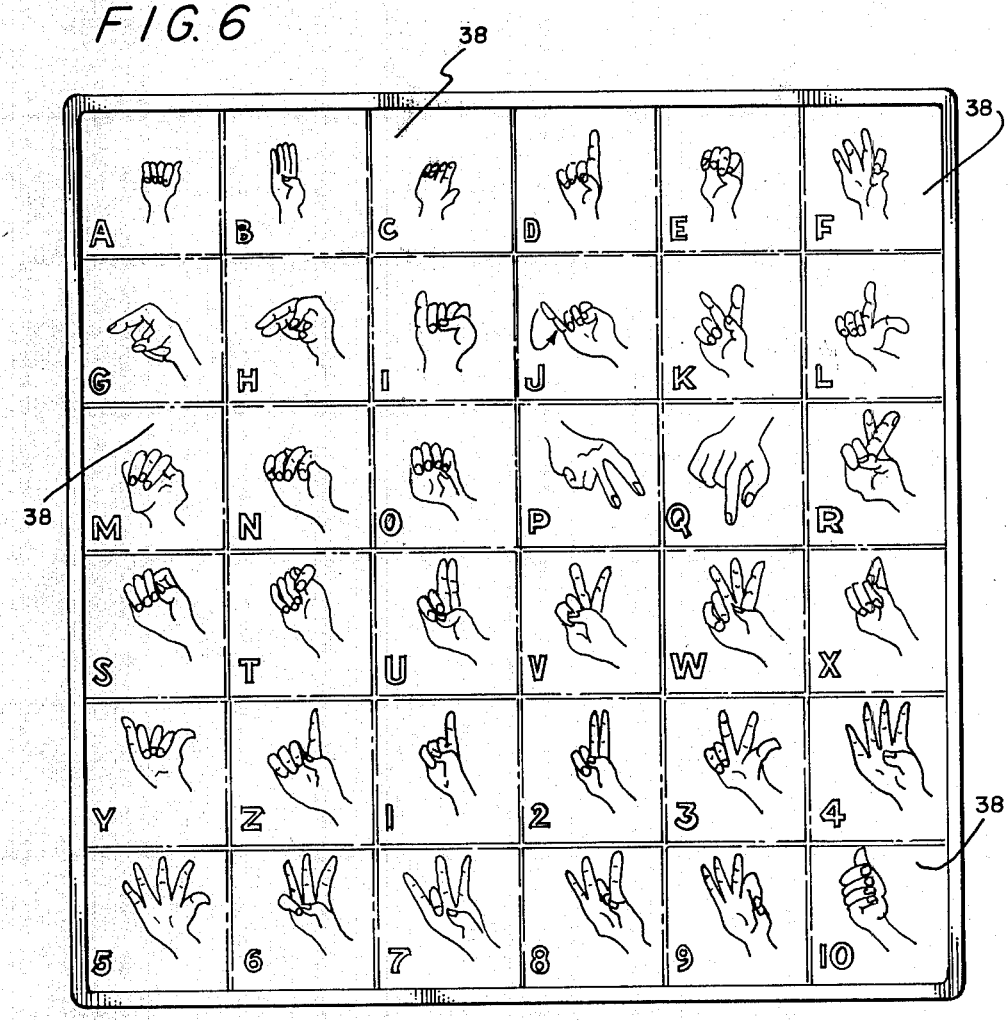

COMMUNICATION AID MEANS AND METHOD

BACKGROUND OF THE INVENTION

1. Field of the Invention

This invention relates to communication. More particularly, this invention provides a communication aid and method which enables a person to communicate with a mute.

2. Description of the Prior Art

U.S. Pat. No. 4,075,621 by Salmon discloses a communication aid for deaf and dumb individuals utilizing a keyboard and a visual display wherein a person may press the desired keys and present a visual display to the deaf and dumb person for communication.

U.S. Pat. No. 3,925,779 by Gertenhaber illustrates a key operated communication device whereby operation of the keys presents a visual display of desired words to the afflicted individual.

None of the foregoing prior art discloses the particular communication aid of this invention.

SUMMARY OF THE INVENTION

It is therefore an object of this invention to provide a communication aid and method.

It is another object of this invention to provide a communication aid and method that enables one to communicate with a mute.

The foregoing objects are achieved according to the practice of this invention. Broadly, this invention is an apparatus for communicating between a mute and another person including a control box having an alphanumeric keyboard with a plurality of switches. Each switch represents and is being labeled with a number or a letter of the alphabet and with the corresponding hand sign of the mute alphabet. A control box electronic circuitry means is disposed within the control box and has a power means and a plurality of conductors electrically engaging in series the power means and the switches and terminating into at least one electrical receptacle in communication with the outside of the control box. A display box comprises a light retention board disposed within the display box and includes a structure defining a plurality of open top chambers having a paneled back including an aperture situated within each of the plurality of chambers. A plurality of lights removably lodge within the apertures such as to have one light per chamber. A translucent panel superimposes the open top chambers of the light retention board. The translucent panel is labeled with the identical indicia of the alphanumeric keyboard and is distributed such that a number or a letter of the alphabet and with the corresponding identifying hand sign of the mute alphabet is imposed over each chamber. A display box electronic circuitry means is disposed behind the light retention board and comprises a plurality of second electrical conductors electrically engaging in series the lights and extending outside of the display box and terminating into at least one plug.

Still other objects and further novel features of the present invention will become more fully apparent from the appended claims and as the ensuing detailed descriptions and discussion proceeds in conjunction with the accompanying drawings, in which:

BRIEF DESCRIPTION OF THE DRAWINGS

FIG. 4 is a partial vertical sectional view taken along the plane of line 4—4 in FIG. 3;

FIG. 5 is a bottom plan view of the display box,

FIG. 6 is a top plan view of the translucent panel;

DETAILED DESCRIPTION OF THE INVENTION

Figure 1:
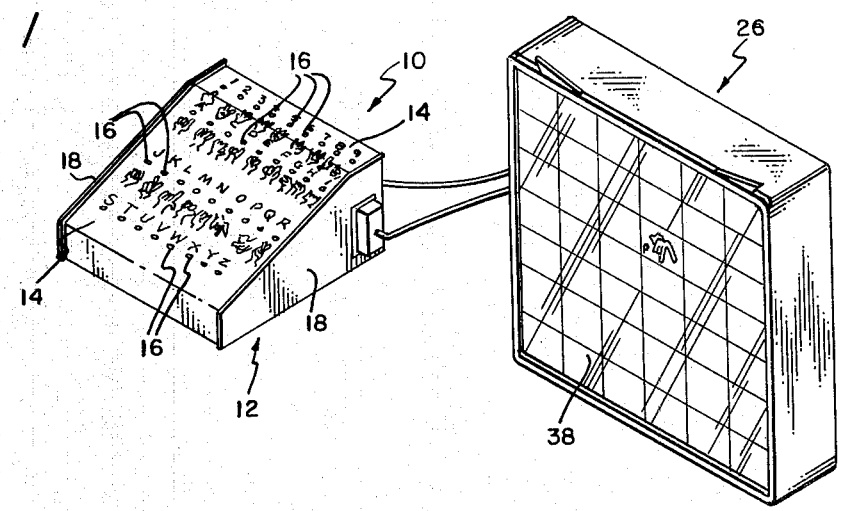
FIG. 1 is a perspective view of the invention.
Figure 2:
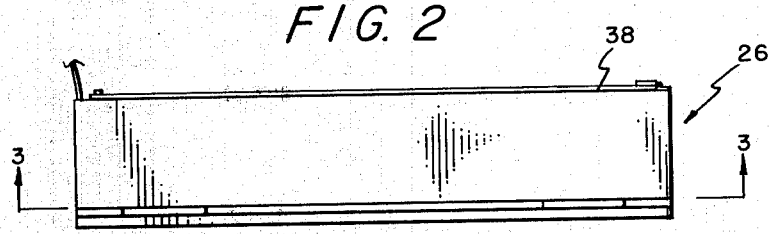
FIG. 2 is a side elevational view of the display box.

Referring in detail now to the drawings, wherein similar parts of the invention are identified by like reference numerals, there is seen an apparatus generally illustrated as 10, for communicating between a mute and another person, which comprises a control box, generally illustrated as 12, having an alphanumeric keyboard 14 with a plurality of spring-biased switches 16. Each switch 16 as can be seen in FIG. 1, represents and is labeled with a number (i.e. 1-9) or a letter of the alphabet (i.e. A-Z) and with the corresponding identifying hand sign of the mute alphabet. The control box 12 also has a pair of sides 18,18.

Figures 7, 8:
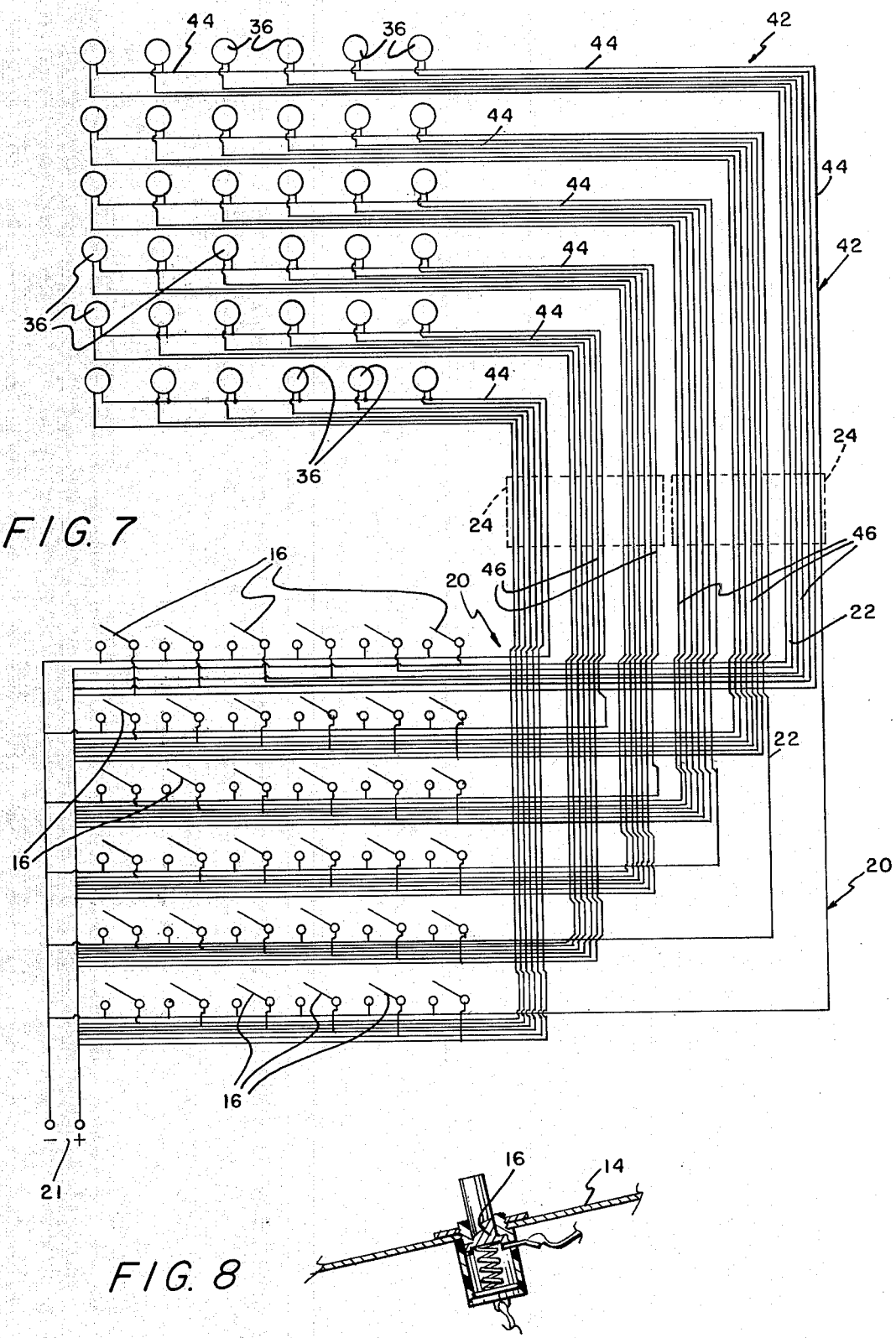
FIG. 7 is a circuitry diagram of the invention.
FIG. 8 is an enlarged vertical sectional view of a spring-biased switch.

The control box 12 has disposed therein an electronic circuitry, generally illustrated as 20 in FIG. 7, having a power means 21 (preferably a battery) and a plurality of conductors 22 electrically engaging in series with the power means 21 and the switches 16 and terminating into two electrical receptacles 24,24 (each receptacle having eighteen holes representing eighteen conductors), each positioned on one of the sides 18.

Figure 3:
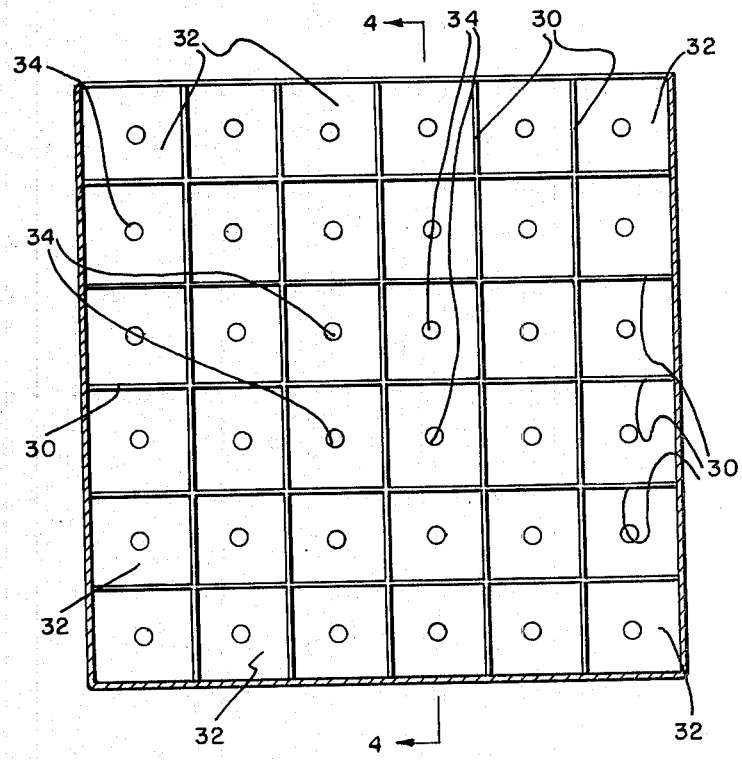
FIG. 3 is a horizontal sectional view taken along the plane of line 3—3 in FIG. 2.

The apparatus 10 also includes a display box, generally illustrated as 26, comprising a light retention board 28 having a structure defining a plurality of square open top chambers 30 including a paneled back 32 with an aperture 34 situated within each of the plurality of chambers 30. A plurality of lights 36 removably lodge within the apertures 34 such as to have one light 36 per chamber 30. A translucent panel 38 is superimposed on the open top chambers 30 of the light retention board 28. Panel 38 is labeled with the identical indicia of the alphanumeric keyboard (see FIG. 3) and being distributed such that a number (i.e. 1-9) or a letter of the alphabet (i.e. A-Z) and with the corresponding identifying hand sign of the mute alphabet is imposed over each chamber 30 (see FIG. 6). The display box 36 has a hinged back 40 (see FIG. 5) for obtaining access into the inside thereof in order to be able to replace the lights 36.

A display box electronic circuitry means, generally illustrated as 42 in FIG. 7, is disposed behind the light retention board 28 and includes a plurality of second electrical conductors 44 electrically engaging in series the lights 36 and extending outside of the display box 26 and terminating into two plugs 46 (eighteen conductors 44 and prongs per plug 46) such that when in operation of the invention the plug 46 of the display box 26 is inserted into the electrical receptacle 24 of the control box circuitry 20 and as a switch 16 on the keyboard 14 (representing and being labeled with a number or a letter of the alphabet and the corresponding identifying hand sign on the mute alphabet) is closed by a user, a light 36 within one of the plurality of chambers 30 lights to illuminate the indicia over that particular chamber 30 which represents the identical number or letter of the alphabet and the corresponding identifying hand sign of the mute alphabet which the closed switch 16 labeled and represented with; thereby enabling the mute to read from the translucent panel 38 as it is illuminated by each light 36.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. An apparatus for communicating between a mute and another person comprising:
  a control box including an alphanumeric keyboard having a plurality of spring-biased switches, each switch representing and being labeled with a number or a letter of the alphabet and with the corresponding identifying hand sign of the mute alphabet;
  a control box electronic circuitry means disposed within said control box and having a power means and a plurality of conductors electrically engaging in series the power means and the switches and terminating into at least one electrical receptacle in communication with the outside of the control box;
  a display box comprising a light retention board disposed within said display box and including a structure defining a plurality of open top square chambers having a paneled back including an aperture situated within each of said plurality of chambers; a plurality of lights removably lodging within said apertures such as to have one light per chamber; a translucent panel superimposing said open top chambers of said light retention board, said translucent panel being labeled with the identical indicia of the alphanumeric keyboard and being distributed such that a number or a letter of the alphabet and with the corresponding identifying hand sign of the mute alphabet is imposed over each chamber;
  a display box electronic circuitry means disposed behind said light retention board and comprising a plurality of second electrical conductors electrically engaging in series said lights and extending outside of said display box and terminating into at least one plug such that when said plug of said display box is inserted into the electrical receptacle of said control box circuitry and as a switch on the keyboard, representing and being labeled with a letter of the alphabet and the corresponding identifying hand sign of the mute alphabet, is closed by a user, a light within one of said plurality of chambers lights to illuminate the indicia over that particular chamber which represents the identical number or letter of the alphabet and the corresponding identifying hand sign of the mute alphabet which said closed switch is labeled and represented with, thereby, enabling the mute to read from the translucent panel as it is illuminated by each light, said power means is a battery, said control box comprises two electrical receptacles, one receptacle situated on each side of said control box, each of said receptacles defined as an eighteen hole receptacle; said display box electronic circuitry means comprises two electronic plugs, each having eighteen prongs to mate with said eighteen hole receptacle; and said display box comprises a hinged box for obtaining access into the inside thereof in order to be able to replace said lights.

2. A method for communicating between a mute and another person comprising:
  (a) providing an actuating and control means having an alphanumeric keyboard labeled with a numeral or a letter of the alphabet and having corresponding identifying hand signs for the mute, said actuating and control means having a plurality of switches, each switch representing and being labeled with a number or a letter of the alphabet and with the corresponding identifying hand signal of the mute alphabet, said actuating and control means having electronic circuitry means disposed therein and a power means and a plurality of conductors electrically engaging in series the power means and the switches and terminating into at least one electrical receptacle in communication with the outside of said actuating and control means;
  (b) providing a display means having a light retention board and a plurality of chambers with a front translucent panel superimposing same, and with the translucent panels individually being labeled with corresponding indicia of the said alphanumeric keyboard, said display means including a display box electronic circuitry means disposed behind said light retention board and comprising a plurality of second electrical conductors electrically engaging in series display lights and extending outside of the display means and terminating into at least one plug means;
  (c) inserting said plug means into said receptacle of said actuating and control means so that by switching upon operation the keys of said keyboard the lights are turned on behind the display panels and illuminating the indicia thereon; and
  (d) operating the keys of said keyboard to light up corresponding numerals or letters on the panels and thereby communicating electronically and by sight with the mute; and
  (e) turning off the display lights after a letter or numeral is displayed to the mute before another letter or numeral is so displayed.

* * * * *